(12) United States Patent
Cervantes et al.

(10) Patent No.: US 12,406,180 B2
(45) Date of Patent: Sep. 2, 2025

(54) METHOD, APPARATUS, AND SYSTEM FOR PROVIDING A LOCATION REPRESENTATION FOR MACHINE LEARNING TASKS

(71) Applicant: HERE Global B.V., Eindhoven (NL)

(72) Inventors: Christopher Cervantes, Chicago, IL (US); Srikrishna Kompella, Oak Park, IL (US)

(73) Assignee: HERE Global B.V., Eindhoven (NL)

( * ) Notice: Subject to any disclaimer, the term of this patent is extended or adjusted under 35 U.S.C. 154(b) by 1142 days.

(21) Appl. No.: 17/116,727

(22) Filed: Dec. 9, 2020

(65) Prior Publication Data

US 2022/0180184 A1  Jun. 9, 2022

(51) Int. Cl.
G06N 3/08 (2023.01)
G06F 16/29 (2019.01)
G06N 3/04 (2023.01)

(52) U.S. Cl.
CPC ............. *G06N 3/08* (2013.01); *G06F 16/29* (2019.01); *G06N 3/04* (2013.01)

(58) Field of Classification Search
CPC ... G06N 3/04; G06N 3/08; G06N 3/063; G06N 3/06; G06F 16/29
See application file for complete search history.

(56) References Cited

U.S. PATENT DOCUMENTS

| | | | | |
|---|---|---|---|---|
| 10,820,166 | B1 * | 10/2020 | Zhang | G06N 3/08 |
| 2010/0179754 | A1 * | 7/2010 | Faenger | G06F 16/9537 |
| | | | | 701/532 |
| 2016/0378861 | A1 * | 12/2016 | Eledath | G06F 3/011 |
| | | | | 707/766 |
| 2018/0174001 | A1 * | 6/2018 | Kang | G06N 3/04 |
| 2019/0145784 | A1 * | 5/2019 | Ma | G06F 16/29 |
| | | | | 701/448 |
| 2020/0107072 | A1 * | 4/2020 | Lomada | G06N 3/084 |
| 2021/0201652 | A1 * | 7/2021 | Mondal | G08B 29/183 |
| 2022/0034668 | A1 * | 2/2022 | Hu | G06N 3/08 |

OTHER PUBLICATIONS

Mikolov et al. "Distributed representations of words and phrases and their compositionality." Advances in Neural Information Processing Systems, 2013, 9 pages.
Simonyan et al., "Very deep convolutional networks for large-scale image recognition." International Conference on Learning Representations. (2015), 14 pages.
Kiros et al. "Skip-thought vectors." Advances in neural information processing systems. 2015, 9 pages.

* cited by examiner

*Primary Examiner* — Kamran Afshar
*Assistant Examiner* — Brian J Hales
(74) *Attorney, Agent, or Firm* — DITTHAVONG, STEINER, & MLOTKOWSKI

(57) ABSTRACT

An approach is provided for providing a location representation for machine learning tasks. The approach, for instance, involves receiving multi-modal relational location data associated with a location as an input to a machine learning model. The approach also involves initiating a processing of the multi-modal relational location data using the machine learning model. The approach further involves extracting a vector representation of the location from a hidden layer of the machine learning model after the processing and providing the vector representation of the location as a location embedding output.

19 Claims, 13 Drawing Sheets

FIG. 7

LOCATION EMBEDDING DATA 701

| | | | | |
|---|---|---|---|---|
| VEC (LOCATION 705a) | 3.223 | -1.204 | 1.353 | ... | -0.123 |
| VEC (LOCATION 705b) | -0.365 | 6.777 | 1.116 | ... | 2.795 |
| VEC (LOCATION 705c) | -0.480 | 6.081 | -4.758 | ... | 0.098 |
| VEC (LOCATION 705d) | 5.223 | -4.164 | 1.511 | ... | 2.282 |

703a, 703b, 703c, 703d

FIXED NUMBER OF ELEMENTS 707
(E.G., 300 ELEMENTS)

METHOD, APPARATUS, AND SYSTEM FOR PROVIDING A LOCATION REPRESENTATION FOR MACHINE LEARNING TASKS

BACKGROUND

Mapping and navigation service providers are making increasing use of machine learning to provide location-based services. Machine learning, for instance, enables service providers to extract underlying spatial and/or semantic relationships between locations and to classify or make predictions based on those relationships or underlying structure. Training of machine learning models to understand these spatial/semantic relationships typically use considerable data, time, and computing resources which is then repeated for each different machine learning task.

SOME EXAMPLE EMBODIMENTS

Therefore, there is a need for representing locations (and/or associated location data) using context-aware (e.g., aware with respect to the underlying spatial or semantic relationships between the location and its neighbors) and application/service independent features, so that the location representation can be used across different machine learning tasks without retraining.

According to one embodiment, a method comprises receiving multi-modal relational location data associated with a location as an input to a machine learning model (e.g., trained to perform general task based on the input of the location using a skip-gram method or similar approach). The method also comprises initiating a processing of the multi-modal relational location data using the machine learning model. The method further comprises extracting a vector representation of the location from a hidden layer of the machine learning model after the processing. The method further comprises providing the vector representation of the location as a location embedding output.

According to another embodiment, an apparatus comprises at least one processor, and at least one memory including computer program code for one or more computer programs, the at least one memory and the computer program code configured to, with the at least one processor, cause, at least in part, the apparatus to receive multi-modal relational location data associated with a location as an input to a machine learning model (e.g., trained to perform general task based on the input of the location using a skip-gram method or similar approach). The apparatus is also caused to initiate a processing of the multi-modal relational location data using the machine learning model. The apparatus is further caused to extract a vector representation of the location from a hidden layer of the machine learning model after the processing. The apparatus is further caused to provide the vector representation of the location as a location embedding output.

According to another embodiment, a non-transitory computer-readable storage medium carries one or more sequences of one or more instructions which, when executed by one or more processors, cause, at least in part, an apparatus to receive multi-modal relational location data associated with a location as an input to a machine learning model (e.g., trained to perform general task based on the input of the location using a skip-gram method or similar approach). The apparatus is also caused to initiate a processing of the multi-modal relational location data using the machine learning model. The apparatus is further caused to extract a vector representation of the location from a hidden layer of the machine learning model after the processing. The apparatus is further caused to provide the vector representation of the location as a location embedding output.

According to another embodiment, an apparatus comprises means for receiving multi-modal relational location data associated with a location as an input to a machine learning model (e.g., trained to perform general task based on the input of the location using a skip-gram method or similar approach). The apparatus also comprises means for initiating a processing of the multi-modal relational location data using the machine learning model. The apparatus further comprises means for extracting a vector representation of the location from a hidden layer of the machine learning model after the processing. The apparatus further comprises means for providing the vector representation of the location as a location embedding output.

According to one embodiment, a method comprises receiving a location embedding comprising a vector representation of a location. The location embedding, for instance, is generated by extracting the vector representation from a hidden layer of an upstream machine learning model that processed location data associated with the location to generate vector representation. The method also comprises providing the location embedding as an input to a machine learning task. An output of the machine learning task is then generated based, at least in part, on the location embedding.

According to another embodiment, an apparatus comprises at least one processor, and at least one memory including computer program code for one or more computer programs, the at least one memory and the computer program code configured to, with the at least one processor, cause, at least in part, the apparatus to receive a location embedding comprising a vector representation of a location. The location embedding, for instance, is generated by extracting the vector representation from a hidden layer of an upstream machine learning model that processed location data associated with the location to generate vector representation. The apparatus is also caused to provide the location embedding as an input to a machine learning task. An output of the machine learning task is then generated based, at least in part, on the location embedding.

According to another embodiment, a non-transitory computer-readable storage medium carries one or more sequences of one or more instructions which, when executed by one or more processors, cause, at least in part, an apparatus to receive a location embedding comprising a vector representation of a location. The location embedding, for instance, is generated by extracting the vector representation from a hidden layer of an upstream machine learning model that processed location data associated with the location to generate vector representation. The apparatus is also caused to provide the location embedding as an input to a machine learning task. An output of the machine learning task is then generated based, at least in part, on the location embedding.

According to another embodiment, an apparatus comprises means for receiving a location embedding comprising a vector representation of a location. The location embedding, for instance, is generated by extracting the vector representation from a hidden layer of an upstream machine learning model that processed location data associated with the location to generate vector representation. The apparatus also comprises means for providing the location embedding as an input to a machine learning task. An output of the machine learning task is then generated based, at least in part, on the location embedding.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is a diagram illustrating example location embedding data, according to one embodiment;

DESCRIPTION OF SOME EMBODIMENTS

Examples of a method, apparatus, and computer program for providing a location representation for machine learning tasks are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
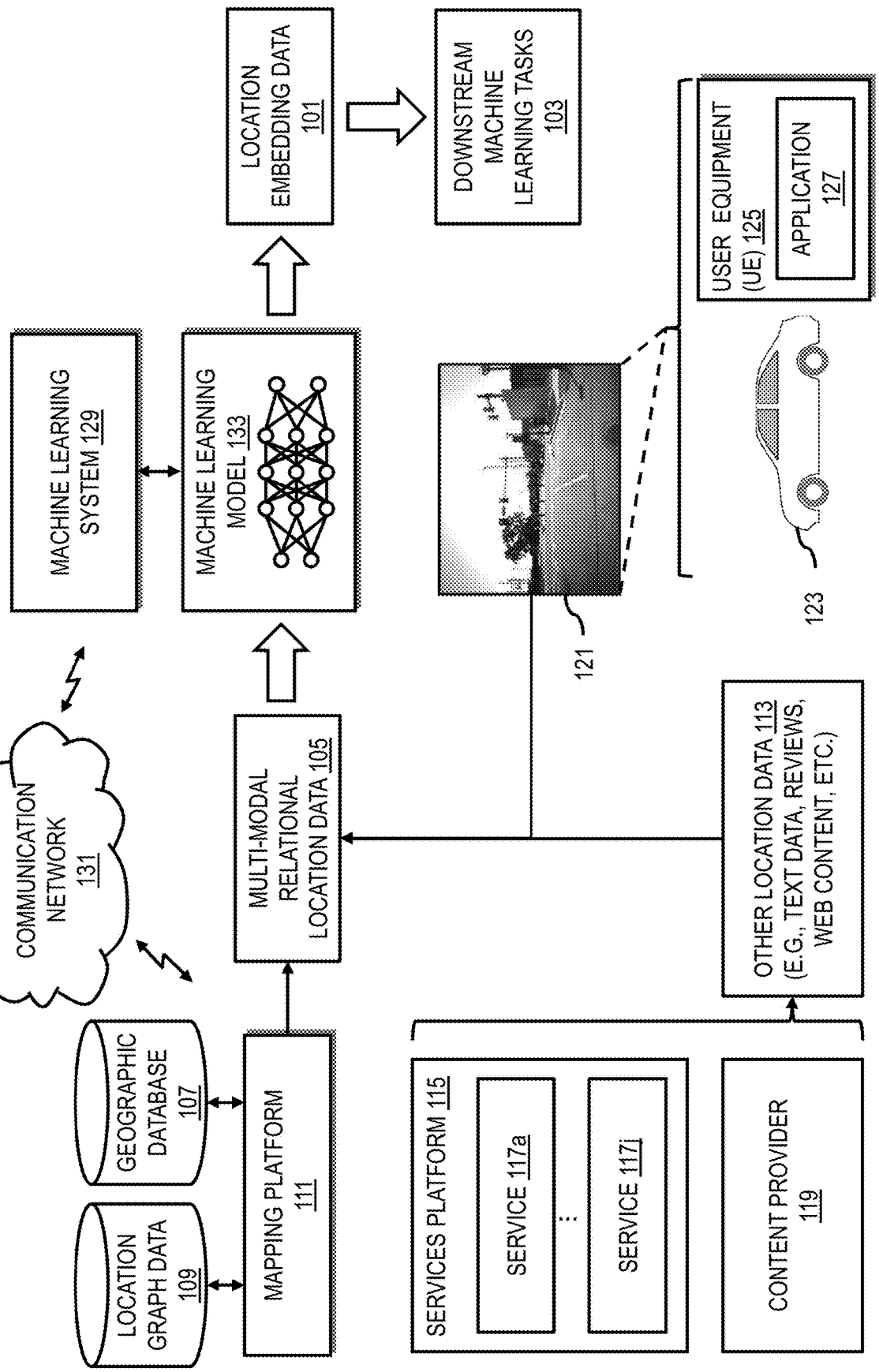
FIG. 1 is a diagram of a system capable of providing a context-aware and application/service independent location representation for machine learning tasks, according to one embodiment.

FIG. 1 is a diagram of a system capable of providing a context-aware and application/service independent location representation for machine learning tasks, according to one embodiment. There are many location-aware applications and services that could benefit from machine learning approaches. However, these approaches are typically trained singly. For example, for each separate machine learning task, corresponding data is collected, and then features are engineered specifically with the specific machine learning task in mind. In the location data domain, the volume of data that is needed to train and validate machine learning models for each task can be considerable. As a result, the amount of data, time, and resources for training machine learning models to perform different tasks can be factor in how many machine learning-based applications and services are developed. Therefore, service providers face significant technical challenges to developing general-use representations of location data for different machine learning tasks.

To address these technical challenges, the system 100 of FIG. 1 introduces a capability to provide general-use representations of location data that can be trained once and then reused as location embeddings (e.g., location embedding data 101) across any number of downstream machine learning tasks 103. In other words, the problem that the various embodiments described herein address is the method by which a general location understanding could be extracted and encoded into location embedding data 101. A generalized understanding of location data representing a location or geographic area, for instance, includes understanding of the underlying structural elements of the location/geographic area based on spatial and/or semantic relationships between the associated location entities (e.g., the location and its neighboring locations or other location objects/entities in the area). Creating location embedding data 101 as a generalized understanding is technically challenging. In part, this is because locations and corresponding location data can be associated with arbitrary text, image data, and/or any other data types, and partially because locations are associated in space and have varying geographic resolutions (e.g., a single point of interest (POI) versus as city) and hierarchy information (e.g., a city and a single POI will be very different, but a complex POI may be similar to a small village in some respects because the complex POI can include descendent location entities).

In other words, the difficulty of the technical challenges arises at least partially because the location data typically used for location-based services and applications are multi-modal relational location data 105. "Multi-modal", for instance, refers to location data being available in a variety of media types (e.g., binary, text, image, etc.) and/or formats. "Relational" refers to the data indicating or from which the underlying structure of the corresponding locations (e.g., physical spatial relationships, semantic relationships—such as how close in meaning to different locations are, etc.) can be extracted. Examples of multi-modal relational location data 105 include, but are not limited, to the digital map data of a geographic database 107 and/or location graph data 109 provided by a mapping platform 111. Other examples of multi-modal relational location data 105 include other location data 113 (e.g., text data, reviews, web content, etc.) generated or otherwise provided by a services platform 115, one or more services 117a-117j (also collectively referred to as services 117) of the services platform 115, one or more content providers 119, and/or the like. Yet another example is image data 121 (e.g., street level imagery) captured by vehicles 123 and/or user equipment (UE) devices 125 executing respective imaging capable application 127 as they travel over a geographic area.

In one embodiment, the system 100 can use a machine learning system 129 to collect (e.g., over a communication network 131) and ingest the multi-modal relational location data 105 as an input (e.g., via input encoding vectors) for processing by a trained machine learning model 133. The location embedding data 101 can be extracted from a hidden layer of the machine learning model 133 after ingesting or processing the multi-modal relational location data 105 for the one or more locations. In one embodiment, the location embedding data 101 can be extracted as real-valued vector representations of locations that encode some aspect of their semantic and spatial properties. The location embedding data 101 is taken not from the output layer of the machine learning model 133, but from a hidden layer (e.g., the penultimate layer before the output layer).

The location embedding data 101 can then be provided as an output for use in performing downstream machine learning tasks 103 such as, but not limited to, search, question answering, relation prediction, etc. In this way, the semantic and spatial properties of the locations encoded in the location embedding data 101 will already be trained, thereby avoiding a need for the downstream machine learning tasks 103 to retrain to learn the structural elements of the locations. As used herein, "downstream" refers to machine learning tasks that occur after the machine learning task used to generate the location embedding data 101.

For example, the downstream machine learning task 103 can be a POI recommendation engine that can recommend POIs to a user based on the user's previously visited POIs. In this example, the downstream machine learning task 101 can use the location embeddings (e.g., vector representations that are generalizable, context-aware, and application independent) for the previously visited POIs and candidate POIs as inputs into a corresponding downstream machine learning model to predict the POIs that the user may want to visit. As result, the downstream machine learning model need not separately train on data to learn the spatial/semantic relationships between the previously visited POIs and candidate POIs, thereby advantageously reducing the time and computing results that would be needed if the location embeddings were not available. It is noted that downstream machine learning task 103 described above is provided by way of example and not as a limitation. It is contemplated that the downstream machine learning task 103 can be any end user application that can accept location embeddings generated according to the embodiments described herein as an input.

In one embodiment, the machine learning model 133 that is used to generate the location embedding data 101 (e.g., an upstream machine learning model) also can be trained to perform any machine learning task that uses the multi-modal relational location data 105 about a location as an input. For example, the machine learning model 133 can be trained to perform a general task or a skip-gram task. The skip-gram model, for instance, assumes a structured (e.g., sequential) input such that the multi-modal relational location data of a location (e.g., at given geographic resolution) can be used to predict one or more neighboring locations at the same geographic resolution and/or their attributes or qualities (e.g., labels, meaning, etc.). With respect to geographic resolution, for instance, if the resolution of the input location is a neighborhood, then the locations predicted by the skip-gram model are adjacent neighborhoods. Similarly, if the input location is specified at a POI resolution, then the output will other adjacent POIs.

The various embodiments described herein for encoding location embedding data 101 can provide significant technical advantages with respect to the speed and ease with which downstream applications (e.g., downstream machine learning tasks 103) can accomplish their goals. Rather than requiring application developers to first define what is important about a location and which pieces of data are relevant to their tasks, the location embedding data 101 would allow developers and service providers (e.g., the mapping platform 111) to describe a location with a single piece of data (e.g., vector representation). A high-quality embedding would contain (generally in a way that is not interpretable to humans) the collected information that the embodiments of embedding-learning process described herein deemed important about that location.

For example, consider that many pieces of information are useful to finding a location along a road network (e.g., distances from known locations, shape, and color of the building, etc.). An address, however, is a single piece of data that accurately defines the location, given a road network, for the purpose of localization. The various embodiments for location embeddings described herein are similar: they would define a location for a broad range of tasks in a way that is interpretable by machines (e.g., other downstream machine learning tasks 103).

Figure 2:
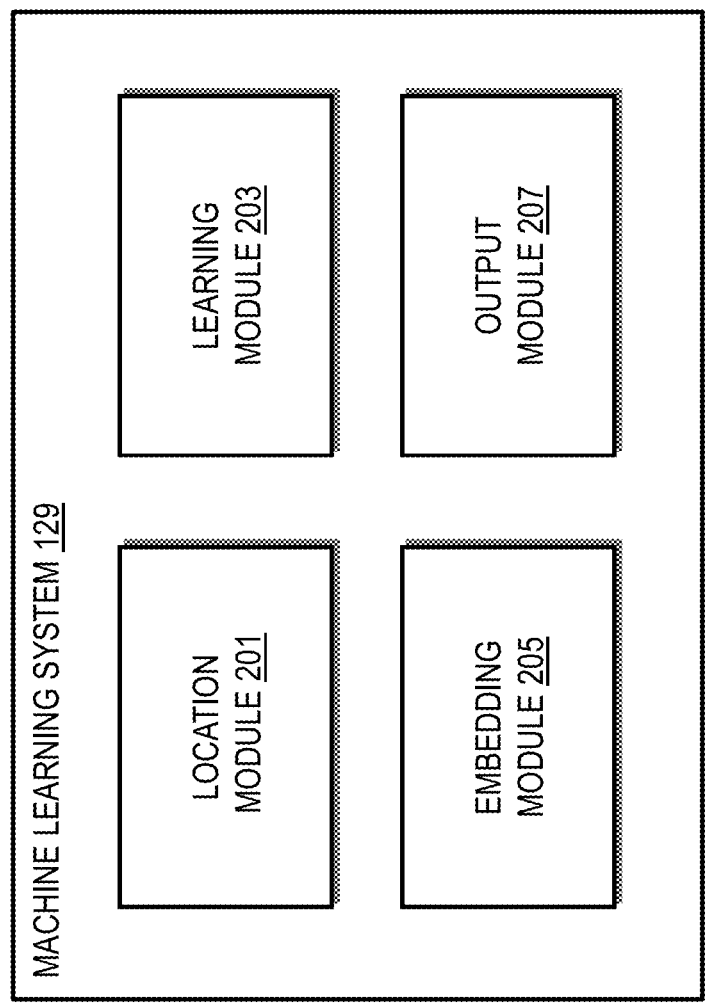
FIG. 2 is a diagram of components of a machine learning system capable of providing a context-aware and application/service independent location representation for machine learning tasks, according to one embodiment.

In one embodiment, as shown in FIG. 2, the machine learning system 129 of the system 100 includes one or more components for providing semantic categorization of arbitrarily granular locations according to the various embodiments described herein. It is contemplated that the functions of the components of the machine learning system 129 may be combined or performed by other components of equivalent functionality. As shown, in one embodiment, the machine learning system 129 includes a location module 201, a learning module 203, an embedding module 205, and an output module 207. The above presented modules and components of the machine learning system 129 can be implemented in hardware, firmware, software, or a combination thereof. Though depicted as a separate entity in FIG. 1, it is contemplated that the machine learning system 129 may be implemented as a module of any of the components of the system 100 (e.g., a component of the mapping platform 111, services platform 115, services 117, content providers 119, vehicles 123, UEs 125, and/or the like). In another embodiment, one or more of the modules 201-207 may be implemented as a cloud-based service, local service, native application, or combination thereof. The functions of the mapping platform 111 and modules 201-207 are discussed with respect to FIGS. 3-10 below.

Figure 3:
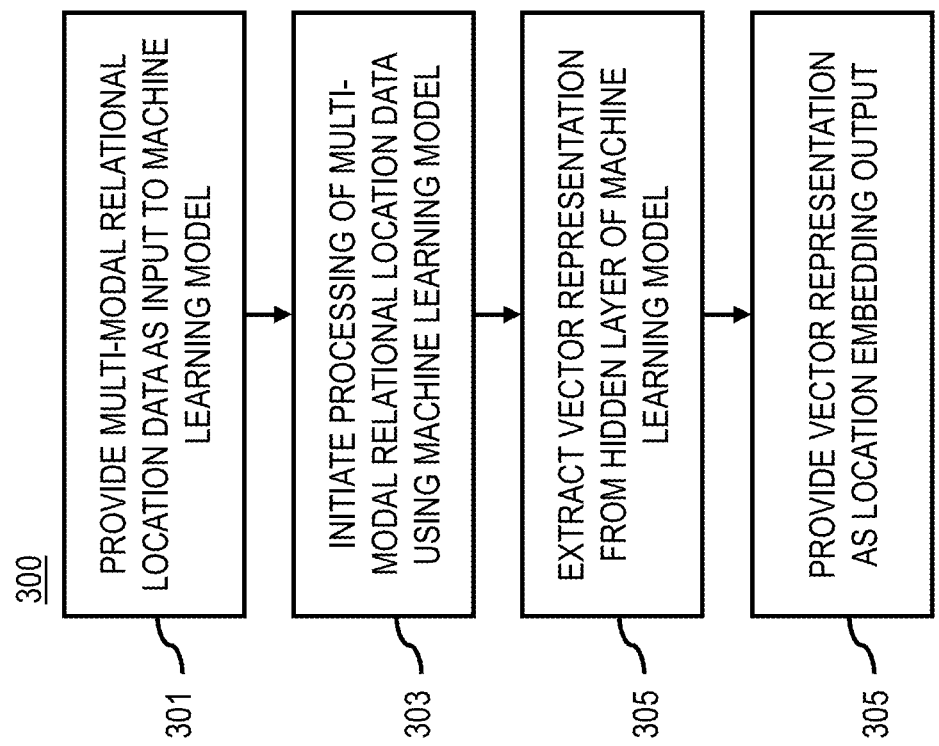
FIG. 3 is a flowchart of a process for providing a context-aware and application/service independent location representation for machine learning tasks, according to one embodiment.
Figure 12:
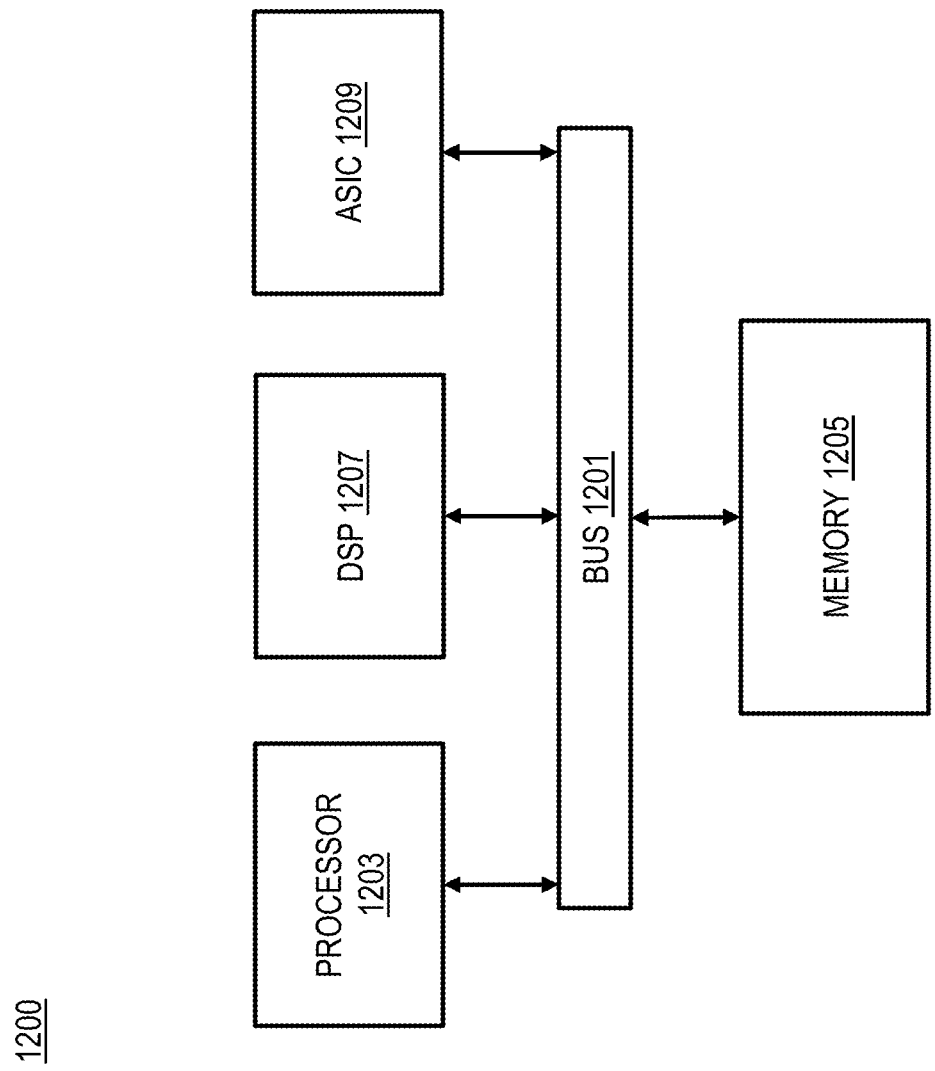
FIG. 12 is a diagram of a chip set that can be used to implement an embodiment of the processes described herein.

FIG. 3 is a flowchart of a process 300 for providing a context-aware and application/service independent location representation for machine learning tasks, according to one embodiment, according to one embodiment. In various embodiments, the machine learning system 129 and/or any of the modules 201-207 may perform one or more portions of the process 300 and may be implemented in, for instance, a chip set including a processor and a memory as shown in FIG. 12. As such, the machine learning system 129 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In step 301, the location module 201 receives multi-modal relational location data 105 associated with a location as an input to a machine learning model (e.g., machine learning model 133). As noted above, the multi-modal relational location data 105 can include location data associated with any arbitrary type of data including but not limited to text data (e.g., other location 113), image data 121, location graph data 109, etc. To ingest or encode the multi-modal relational location data 105, the location module 201 can use any feature engineering method including, but not limited to, drawing on the location graph data 109, external ontologies, street-level imagery 121, another of the other location data 113 (e.g., reviews, web content), etc.

In one embodiment, depending on the available multi-modal relational location data 105 and/or selected input features, the location embedding data 101 resulting from the process 300 can be resolution dependent (e.g., a city embedding will not be interpretably mixed with a POI embedding). In other words, the location of the input can be provided at a designated geographic resolution (e.g., city, neighborhood, POI, etc.). For example, a location can refer to anything from an individual POI (or even a part of a POI such as a specific location within a POI—e.g., a floor within a building POI) to a larger administrative area like a street, neighborhood, city, etc. The location embedding output then applies to or is otherwise restricted to one or more downstream machine learning tasks 103 that use the designated geographic resolution.

In one embodiment, the multi-modal location data is extracted (at least in part) from location graph data 109. A location graph, for instance, comprises multi-modal relational location data 105 associated with one or more location entities. The location graph represents the one or more location entities as respective nodes, and relationship information (e.g., spatial and/or semantic relationship) between the one or more location entities as edges between the nodes. These relationships or structural information may be spatial, temporal, or dynamic. Furthermore, semantic descriptions such as, but not limited to, "nearby", "across from", "inside", etc. can be used to describe spatial or semantic relationships between location objects where precise position is not known. In embodiments where the precise position is known (e.g., from the geographic database 107) the relationships in the location graph can be based on this precise positioning. These relationships may include attributes such as, but not limited to, distances, weight, text descriptions, binary objects, and/or the like.

Figure 4:
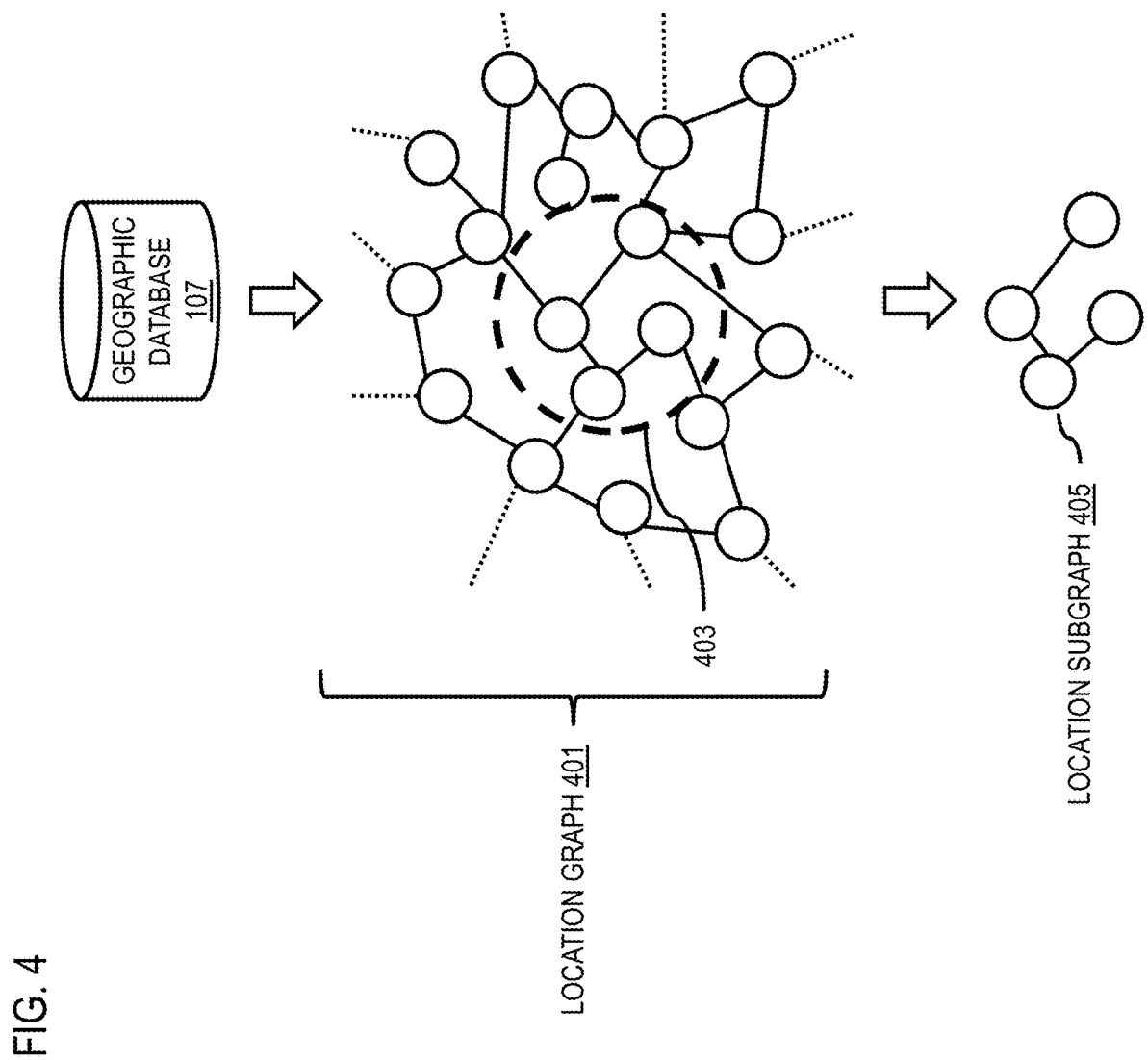
FIG. 4 is a diagram illustrating an example location graph comprising multi-modal relational location data for generating location embeddings, according to one embodiment.

FIG. 4 is a diagram illustrating an example location graph comprising multi-modal relational location data for generating location embeddings, according to one embodiment. In the example of FIG. 4, the digital map data of the geographic database 107 can be processed to generate a location graph 401 of the location entities (e.g., POIs, places, terrain features, administrative areas, and/or any other stored cartography/map features at any geographic resolution) of the geographic database 107. The location graph 401, for instance, can represent all of the stored location entities of the geographic database 107 or just a portion of the geographic database 107 (e.g., location graph associated with a country, region, city, etc.). As previously discussed, the location graph 401 can model relationships between location entities or objects in a variety of ways. Location entities and their relationships may be described using a set of labels (e.g., entity categories such as restaurant, park, office building, etc.). Location entities or objects may be referred to as "nodes" of the location graph 401 (e.g., represented as circles in FIG. 4) and the "edges" (e.g., represented as lines between nodes in FIG. 4) represent relationships between nodes, where the nodes and relationships among nodes may have data attributes. The organization of the location graph 401 may be defined by a data scheme which defines the structure of the data. The organization of the nodes and relationships may be stored in an ontology (e.g., in the location graph data 109, the geographic database 107, or external data source) which defines a set of concepts where the focus is on the meaning and shared understanding. These descriptions permit mapping of concepts from one domain to another.

In one embodiment, the data attributes associated with the nodes and/or edges of the location graph 401, may include multi-modal relational location data 105. The multi-modal relational location data 105 includes geographic location data, relative location data, place category data, imagery data, text data, context data, or a combination thereof associated with the one or more location entities, a geographic area in which the one or more entities are located, or a combination thereof. In one embodiment, the multi-model relational location data 105 can be retrieved from a third-party external semantic data source.

In other words, the location graph 401 is a knowledge graph of nodes that are interrelated with relationships between the different nodes. As previously described, in a location graph, the nodes are location entities or objects. For example, a node may be a POI such as a theater. Other nodes may include a first street, a second street, a parking lot, etc. Relationships may interconnect the nodes of the location graph 401, such as a relationship between the theater node and the first street may include a numerical address, where the numerical address is the relationship between the first street and the theater. A parking lot node may be affiliated with the theater node, and the relationship may be an indication of parking available for the theater. The relationship between the second street node and the theater node may include an entrance to the parking lot, such that the second street node is connected to the theater node by way of the parking lot node.

While example embodiments may include location entities as nodes, nodes may take many forms, including an event, for example. An event may be a node that includes a time (date/time), location, event type (e.g., sporting event), etc. That node may be related to the physical location of the event, transportation nodes, or other elements that have a contextual relationship with the event. The relationships or connections amongst the nodes of a location graph may be contextual links, whereby the relationships relate to how a node is connected to another node.

As shown in FIG. 4, a portion of the location graph 401 can be partitioned (e.g., partitioned as indicated by the boundary 403) to create or otherwise designate a location subgraph 405 corresponding to the location at the designate resolution level that for which the location embedding is to be created. The multi-modal relational location data 105 associated with the location subgraph can then be encoded into an input vector. Thus the location module 201 can create sparse feature representations for a location at a given resolution.

Figure 5:
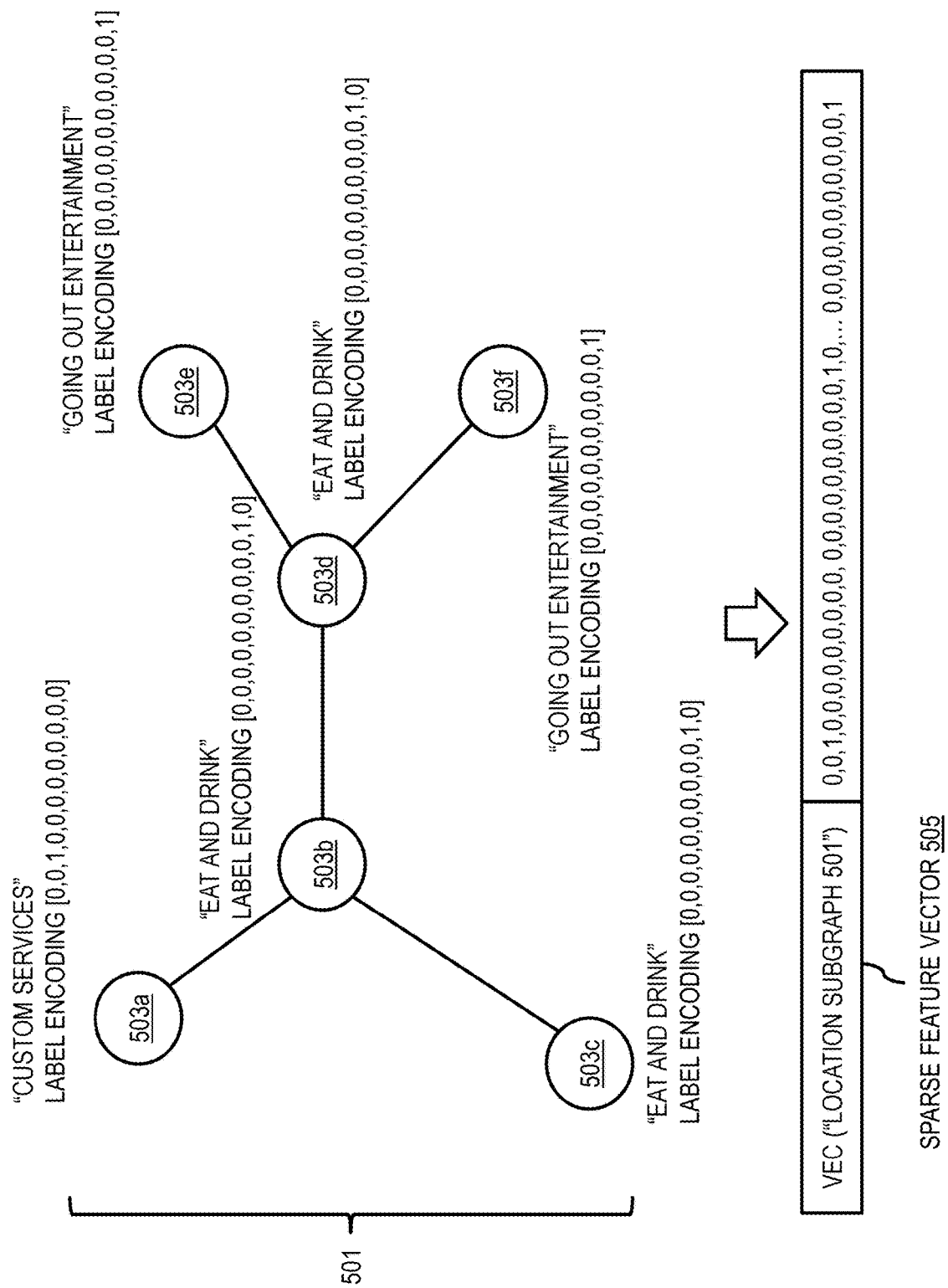
FIG. 5 is a diagram illustrating an example of encoding a sparse feature vector based on multi-modal relational location data, according to one embodiment.

FIG. 5 is a diagram illustrating an example of encoding a sparse feature vector based on multi-modal relational location data, according to one embodiment. In this example, a location subgraph 501 represents a location for which a location embedding is to be created at a designated geographic resolution. At this resolution, the location subgraph includes six nodes 503a-503f representing respective location entities included with the location of interest. Multi-modal relational location data 105 indicates, for instance, the place category of each node (e.g., "Custom services", "Eat and drink", and "Going out entertainment"). Each place category, in turn, is associated with a label encoding (e.g., encoded using one-hot encoding). The location module 201 can process the location subgraph 501 to create a sparse feature vector 505 for the location subgraph 501 (e.g., vec ("location subgraph 501")) by concatenating the label encoding of the place category of each node 503. The feature vector 505 is sparse because the one-hot encoding results in vector containing a value of 0 for the vast majority of the vector elements.

In step 303, after extracting a feature vector from the multi-modal relational location data 105 associated with the location of interest, the embedding module 205 initiates a processing of the multi-modal relational location data (e.g., represented as the extracted feature vector) using the machine learning model selected for creating the location embedding data 101. In one embodiment, the embedding module 205 can select the type of machine learning model to use based on the location context (e.g., the type and/or number of neighboring locations to the location).

In one example embodiment, the machine learning model is a skip-gram type model that is trained (e.g., by the learning module 203) to predict one or more other locations associated with the location based on the input. A skip-gram model, for instance, takes the feature vector of a location and predicts the location's context (e.g., neighbors) or other related attributes. In one use case, the skip-gram model can accept encodings of the spatial relationships of locations or map tile encodings of specific locations' neighbors to predict a specific locations on a map tile or other designated geographic area. In short, in an embodiment under this approach, the input is location context, and the output is the item or location of interest (e.g., the machine learning model is trained to predict a location based on one or more other locations neighboring or otherwise associated with the location). Thereof, encoding of the input (location context) by the machine learning model performing this type of task can provide a vector representation (e.g., location embedding) of the location.

In another example embodiment, the machine learning model is trained to perform a general task based on the input (e.g., trained by the learning module 203). This general task can be any task that uses the feature vector of the location as an input to generate the model's output. For example, the general task can include but is not limited to a location categorization task, a search task, etc.

It is noted that the types of machine learning models described above are provided by way of illustration and not as limitations. It is contemplated that any type of model or training can be applied to the machine learning model for generating the location embedding output. It is noted that the type or extent of training of the machine learning is also not a factor in selecting the machine learning model to use. Instead, in one example embodiment, one selection factor is whether the machine learning operates on the multi-modal relational location data of the extracted feature in a way that generates an intermediate representation of the location within its hidden layers.

Figure 6:
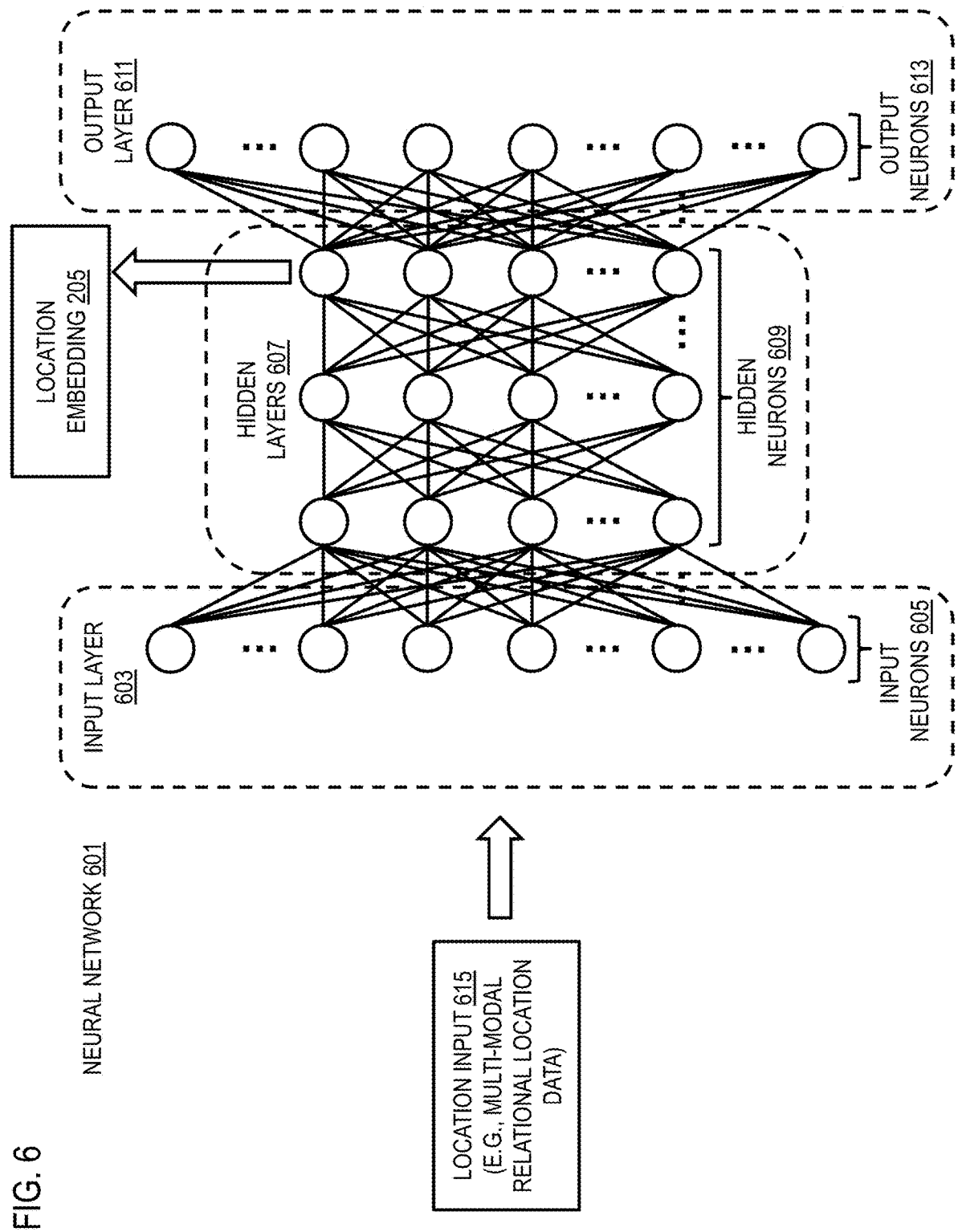
FIG. 6 is a diagram illustrating an example machine learning model from which a context-aware and application/service independent location representation for machine learning tasks can be extracted, according to one embodiment.

FIG. 6 is a diagram illustrating an example machine learning model from which a context-aware and application/service independent location representation (e.g., location embedding) for machine learning tasks can be extracted, according to one embodiment. As shown, the example machine learning model is a neural network 601 that includes an input layer 603 containing input neurons 605, a hidden layer 607 containing hidden neurons 609, and an output layer 611 containing output neurons 613. In this example, the input neurons 605 respectively correspond to one or more input features of the location input 615 (e.g., a feature vector representing multi-modal relational location data associated with a location of interest). In the location data domain, the number of features can be quite large (e.g., thousands or tens of thousands of features and corresponding input neurons 605). The hidden layer 607 can contain any number of layers of hidden neurons 609 depending on the selected architecture or application of the network 601. The output layer 611 contains output neurons 613 corresponding to each possible output category. Again, in the location data domain, the potential number categories can be significant.

With respect to step 301, the embedding module 205 feeds the extracted feature vector corresponding to a location of interest (e.g., location input 615) into the input layer 603. In this example, the neural network 601 is trained meaning that the weights and coefficients of the neurons and connection between the neurons of the different layers 603, 607, and 611 have been adjusted to make accurate predictions. The neural network 601 can be a feed forward network that propagates messages from in the input layer 603 through subsequent adjacent layers of the hidden layers 607 and to the output layer. Message propagation through the neural network 601 is determined by respective aggregation and propagation functions at each neuron. So, by providing the input feature vector to the input layer 603, the embedding module 205 causes a cascade of neuronal value updates throughout the network 601 from the input layer 603 towards the output layer 611.

In step 305, the embedding module 205 can extract a vector representation of the location of interest from a hidden layer of the machine learning model after the processing (e.g., input of the multi-modal relational location data associated with the location of interest). Extracting, for instance, refers to reading the aggregation function values at each neuron of a selected hidden layer. Referring back to the example FIG. 6, the neural network 601 includes three hidden layers 607. In one embodiment, the vector representation of the location can be extracted from the penultimate layer (e.g., the hidden layer immediately preceding the output layer 611). This is because, as messages propagate feed forward through the neural network 601, the encoding of the various attributes of the neurons can be more dense or be associated with more predictive features. It is noted that the features or attributes correspond to respective features, but in many cases the features have been abstracted through the neural network 601 so that the features are not likely to be human understandable (e.g., although they do reflect the position of the location within an N-dimensional feature space of the neural network 601). It is noted, however, although one example embodiment extracts from the penultimate layer, it is contemplated the vector representation to use as a location embedding can be extracted from any of the hidden layers.

By way of example, the vector representation is a fixed-length, real-valued vector that encodes one or more attributes of the location. As noted above, the attributes correspond to respective neurons of the hidden layer. Accordingly, in one embodiment, the fixed-length of the vector representation is based on the number of neurons in the hidden layer from which the vector is extracted. For example, if there are 300 neurons in the hidden layer, then the vector will be 300 elements in length with each element corresponding to the aggregation function value of a respective neuron.

In step 307, the output module 207 provides the vector representation of the location as a location embedding output (e.g., location embedding data 101). FIG. 7 is a diagram illustrating example location embedding data 701, according to one embodiment. As shown, location embedding data 701 includes vectors 703a-703d (also collectively referred to as vectors 703) that respectively represent locations 705a-705d (also collectively referred to locations 705).

In this example, the vectors 703 are labeled to identify the respective locations 705, followed by a one-dimensional array of attribute elements values extracted from the hidden layer of the embedding machine learning model at a fixed number of elements 707 (e.g., 300 elements). Conceptually, the vector defines the position of the corresponding location of interest within a feature space with a number of dimensions equal to the number elements of the vectors 703 (e.g., 300 elements=a 300 dimension feature space). The distance between each vector in the feature space represents the computed similarity of closeness of locations within the feature space, based on the underlying structure extracted from the multi-modal relational location data 105. Because the underlying structure can include both spatial and semantic relationships, the feature space also can represent both the physical and the semantic relationships of different locations. For example, Washington, D.C., and Paris may be similar semantically because they are both capital cities but are physically distant. This latent structural information (among others that may not be human interpretable) can be encoded in the location embeddings.

In one embodiment, the output module 207 can provide the location embedding output as an input to one or more downstream machine learning tasks 103. In this way, the downstream machine learning tasks 113 can benefit from the already encoded multi-modal relational location data in the location embeddings. The location embedding output can be provided in any data structure or format. For example, the vectors can be present as list in a text file that can be ingested by the downstream machine learning tasks 103.

Figure 8:
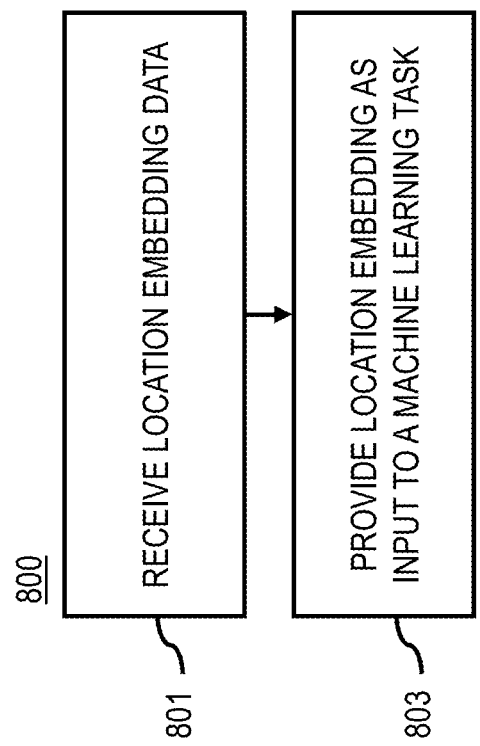
FIG. 8 is a flowchart of a process for using a location embedding for a machine learning task, according to one embodiment.

FIG. 8 is a flowchart of a process 800 for using a location embedding for a machine learning task, according to one embodiment. In various embodiments, the machine learning system 129 and/or any of the modules 201-207 may perform one or more portions of the process 800 and may be implemented in, for instance, a chip set including a processor and a memory as shown in FIG. 12. As such, the machine learning system 129 and/or any of the modules 201-207 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In step 801, embedding module 205 (e.g., of a machine learning system 103 associated with a downstream machine learning task 103) receives a location embedding comprising a vector representation of a location. The location embedding is generated by extracting the vector representation from a hidden layer of an upstream machine learning model that processed location data associated with the location to generate vector representation (e.g., according to the process 300 described above). As used herein, the term "upstream" refers to a machine learning model that generated the location embedding before providing it to the downstream machine learning task 103.

In step 803, the embedding module 205 provides the location embedding as an input to a machine learning task. In one embodiment, the machine learning task is "downstream" relative to (e.g., occurring after) the creation of the location embedding. It is contemplated that the machine learning task can used any machine learning model or approach provided that the output of the machine learning task is generated based, at least in part, on the location embedding. In other words, the machine learning task is performed based, at least in part, on the encoded attributes of the vector representations of locations in the embedding data.

Figure 9:
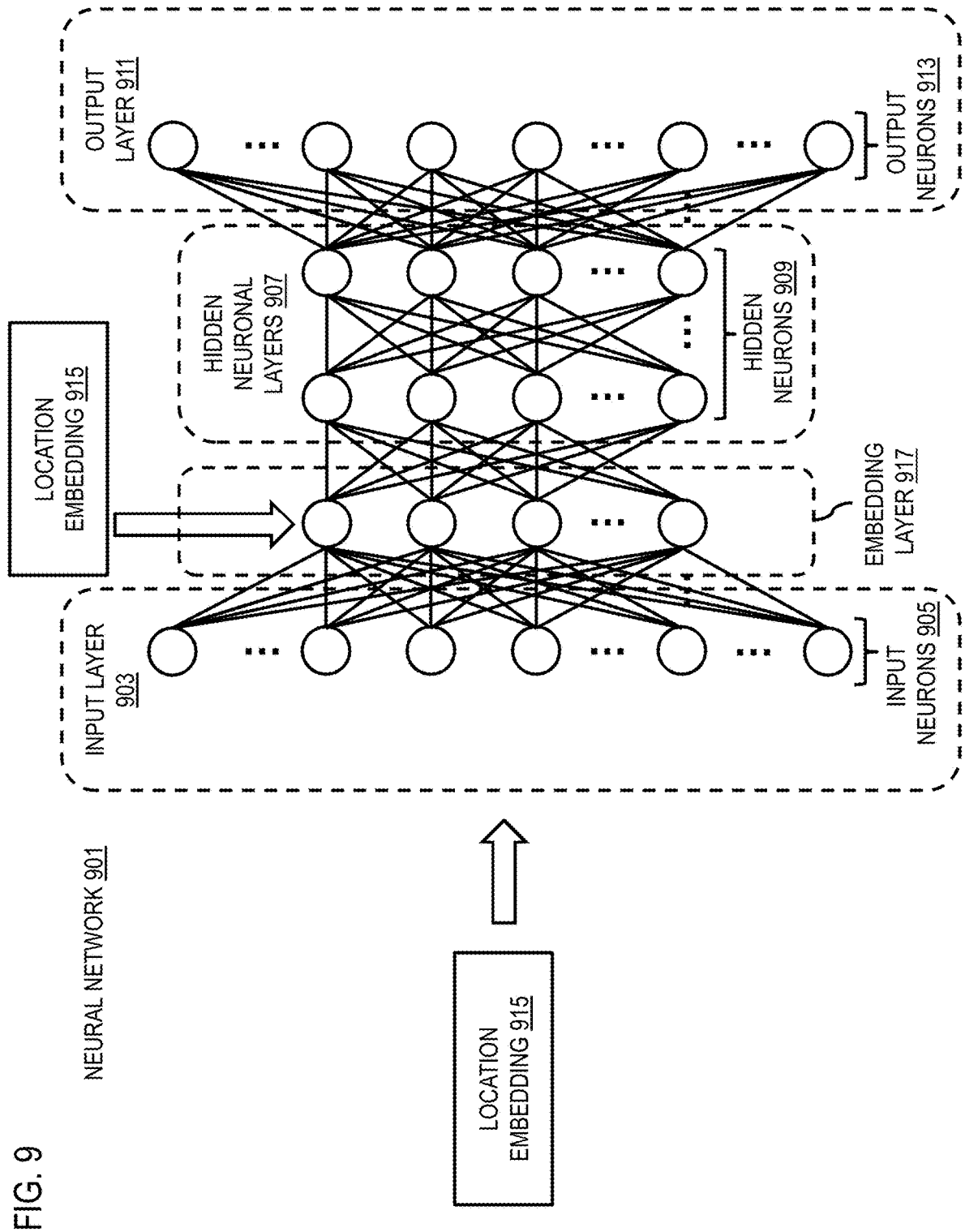
FIG. 9 is a diagram illustrating an example neural network capable of using a location embedding, according to one embodiment.

It is contemplated that the machine learning task can input the location embedding to its machine learning model using any means as illustrated in FIG. 9. FIG. 9 is a diagram illustrating an example neural network capable of using a location embedding, according to one embodiment. The neural network 901 is similar in structure to the neural network 601 of FIG. 6 and includes an input layer 903 containing input neurons 905, hidden layers 907 containing hidden neurons 909, and an output layer 911 containing output neurons 913.

In one example embodiment, the vector representation of a location (e.g., location embedding 915) can be used as a direct input into the machine learning task (e.g., the neural network 901). The direct input, for instance, feeds the vector representation in the input layer 903. The location embedding 915 may optionally be fed in with other input features applicable to the specific machine learning task being performed.

In another example embodiment, the vector representation or location embedding 915 can be input or otherwise included in an embedding layer 917 of the machine learning task (e.g., neural network 901). For example, if the location embedding 915 includes a large number of location vector representations, it may be more efficient to include the location embedding 915 in the embedding layer 917. Although the embedding layer 917 is depicted as the first layer after the input layer 903, it is contemplated that the embedding layer 917 may be included at any other layer of the neural network 901. In some embodiments, multiple embedding layers 917 may be included in the neural network (e.g., different embedding layers at different resolutions, or associated with different domains, services, etc.).

Returning to FIG. 1, as shown, the system 100 includes a machine learning system 129 for providing a generalizable location representation for machine learning tasks according to the various embodiments described herein. In one embodiment, the machine learning system 129 includes or is otherwise associated with one or more machine learning models 133 (e.g., neural networks or other equivalent network) for generating location embeddings. The machine learning models 133 can also be used as part of a computer vision system for detecting new or updated places through image analysis.

In one embodiment, the machine learning system 129 has connectivity over the communication network 131 to the mapping platform 111, services platform 115 that provides one or more services 117 that can use location embedding data 101 for downstream machine learning tasks 103 to perform one or more functions. By way of example, the services 117 may be third party services and include but is not limited to mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 117 uses the output of the machine learning system 129 (e.g., location embeddings) to provide services 117 such as navigation, mapping, other location-based services, etc. to the vehicles 123, UEs 125, and/or applications 127 executing on the UEs 125.

In one embodiment, the machine learning system 129 may be a platform with multiple interconnected components. The machine learning system 129 may include multiple servers, intelligent networking devices, computing devices, components, and corresponding software for providing location embeddings according to the various embodiments described herein. In addition, it is noted that the machine learning system 129 may be a separate entity of the system 100, a part of the mapping platform 111, one or more services 117, a part of the services platform 115, or included within components of the vehicles 123 and/or UEs 125.

In one embodiment, content providers 119 may provide content or data (e.g., including geographic data, etc.) to the geographic database 107, machine learning platform 128, the mapping platform 111, the services platform 115, the services 117, the vehicles 123, the UEs 125, and/or the applications 127 executing on the UEs 125. The content provided may be any type of content, such as machine learning models, map embeddings, map content, textual content, audio content, video content, image content, etc. In one embodiment, the content providers 119 may provide content that may aid in providing location embeddings according to the various embodiments described herein. In one embodiment, the content providers 119 may also store content associated with the machine learning system 129, geographic database 107, mapping platform 111, services platform 115, services 117, and/or any other component of the system 100. In another embodiment, the content providers 119 may manage access to a central repository of data, and offer a consistent, standard interface to data, such as a repository of the geographic database 107.

In one embodiment, the vehicles 123 and/or UEs 125 may execute software applications 127 to detect map features/objects for location embedding according the embodiments described herein. By way of example, the applications 127 may also be any type of application that is executable on the vehicles 123 and/or UEs 125, such as autonomous driving applications, mapping applications, location-based service applications, navigation applications, device control applications, content provisioning services, camera/imaging application, media player applications, social networking applications, calendar applications, and the like. In one embodiment, the applications 127 may act as a client for the mapping platform 111 and perform one or more functions associated with providing location embeddings alone or in combination with the mapping platform 111.

By way of example, the vehicles 123 and/or UEs 125 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 123 and/or UEs 125 can support any type of interface to the user (such as "wearable" circuitry, etc.). In one embodiment, the vehicles 123 and/or UEs 125 may be associated with or be a component of a vehicle or any other device.

In one embodiment, the vehicles 123 and/or UEs 125 are configured with various sensors for generating or collecting environmental image data (e.g., multi-modal relational location data for processing by machine learning system 129), related geographic data, etc. In one embodiment, the sensed data represent sensor data associated with a geographic location or coordinates at which the sensor data was collected, and the polyline or polygonal representations of detected objects of interest derived therefrom. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 123 and/or UEs 125 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicles 123 and/or UEs 125 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicles 123 and/or UEs 125 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 131 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 129, mapping platform 111, services platform 115, services 117, vehicles 123 and/or UEs 125, and/or content providers 119 communicate with each other and other components of the system 100 using well known, new or still developing protocols. In this context, a protocol includes a set of rules defining how the network nodes within the communication network 131 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
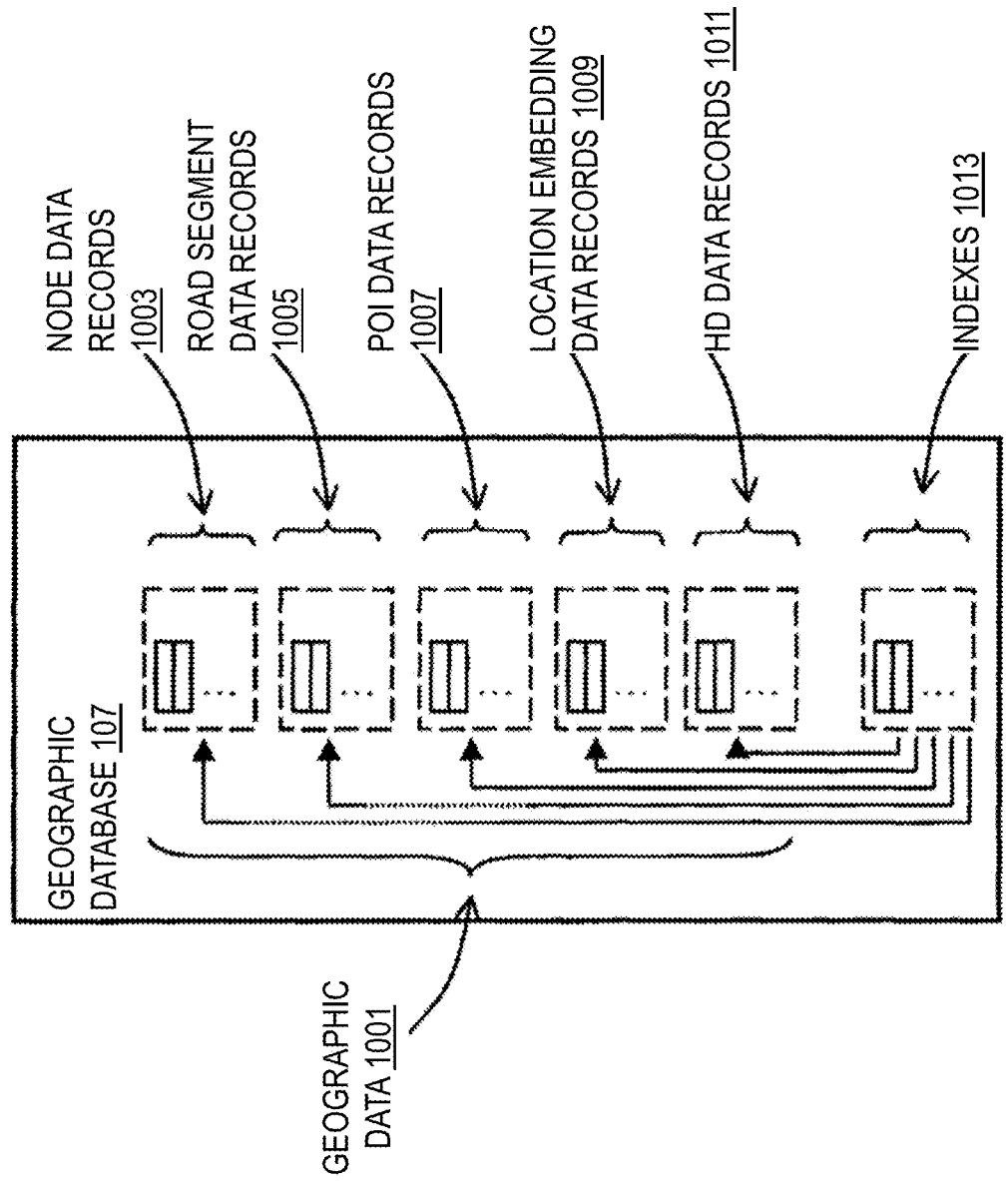
FIG. 10 is a diagram of a geographic database, according to one embodiment.

FIG. 10 is a diagram of a geographic database, according to one embodiment. In one embodiment, the geographic database 107 includes geographic data 1001 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 1001. In one embodiment, the geographic database 107 include high definition (HD) mapping data that provide centimeter-level or better accuracy of map features. For example, the geographic database 107 can be based on Light Detection and Ranging (LiDAR) or equivalent technology to collect billions of 3D points and model road surfaces and other map features down to the number lanes and their widths. In one embodiment, the HD mapping data (e.g., HD data records 1011) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 107.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 107 follows certain conventions. For example, links do not cross themselves and do not cross each other except at a node. Also, there are no duplicated shape points, nodes, or links. Two links that connect each other have a common node. In the geographic database 107, overlapping geographic features are represented by overlapping polygons. When polygons overlap, the boundary of one polygon crosses the boundary of the other polygon. In the geographic database 107, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 107 includes node data records 1003, road segment or link data records 1005, POI data records 1007, location embedding data records 1009, HD mapping data records 1011, and indexes 1013, for example. More, fewer, or different data records can be provided. In one embodiment, additional data records (not shown) can include cartographic ("cartel") data records, routing data, and maneuver data. In one embodiment, the indexes 1013 may improve the speed of data retrieval operations in the geographic database 107. In one embodiment, the indexes 1013 may be used to quickly locate data without having to search every row in the geographic database 107 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points (for example, representing intersections or an end of a road) corresponding to the respective links or segments of the road segment data records 1005. The road link data records 1005 and the node data records 1003 represent a road network, such as used by vehicles, cars, and/or other entities. Alternatively, the geographic database 107 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 107 can include data about the POIs and their respective locations in the POI data records 1007. The geographic database 107 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 107 can also include location embedding data records 1009 for location embeddings, location graphs, machine learning model parameters, and/or any other related data that is used or generated according to the embodiments described herein. By way of example, the location embedding data records 1009 can be associated with one or more of the node records 1003, road segment records 1005, and/or POI data records 1007 to associate the semantic category predictions with specific places, POIs, geographic areas, and/or other map features. In this way, the semantic category data records 1009 can also be associated with the characteristics or metadata of the corresponding records 1003, 1005, and/or 1007.

In one embodiment, as discussed above, the HD mapping data records 1011 model road surfaces and other map features to centimeter-level or better accuracy. The HD mapping data records 1011 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 1011 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 1011 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1011.

In one embodiment, the HD mapping data records 1011 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 107 can be maintained by the content provider 119 in association with the services platform 115 (e.g., a map developer). The map developer can collect geographic data to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicles 123 and/or UEs 125. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing location embeddings may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
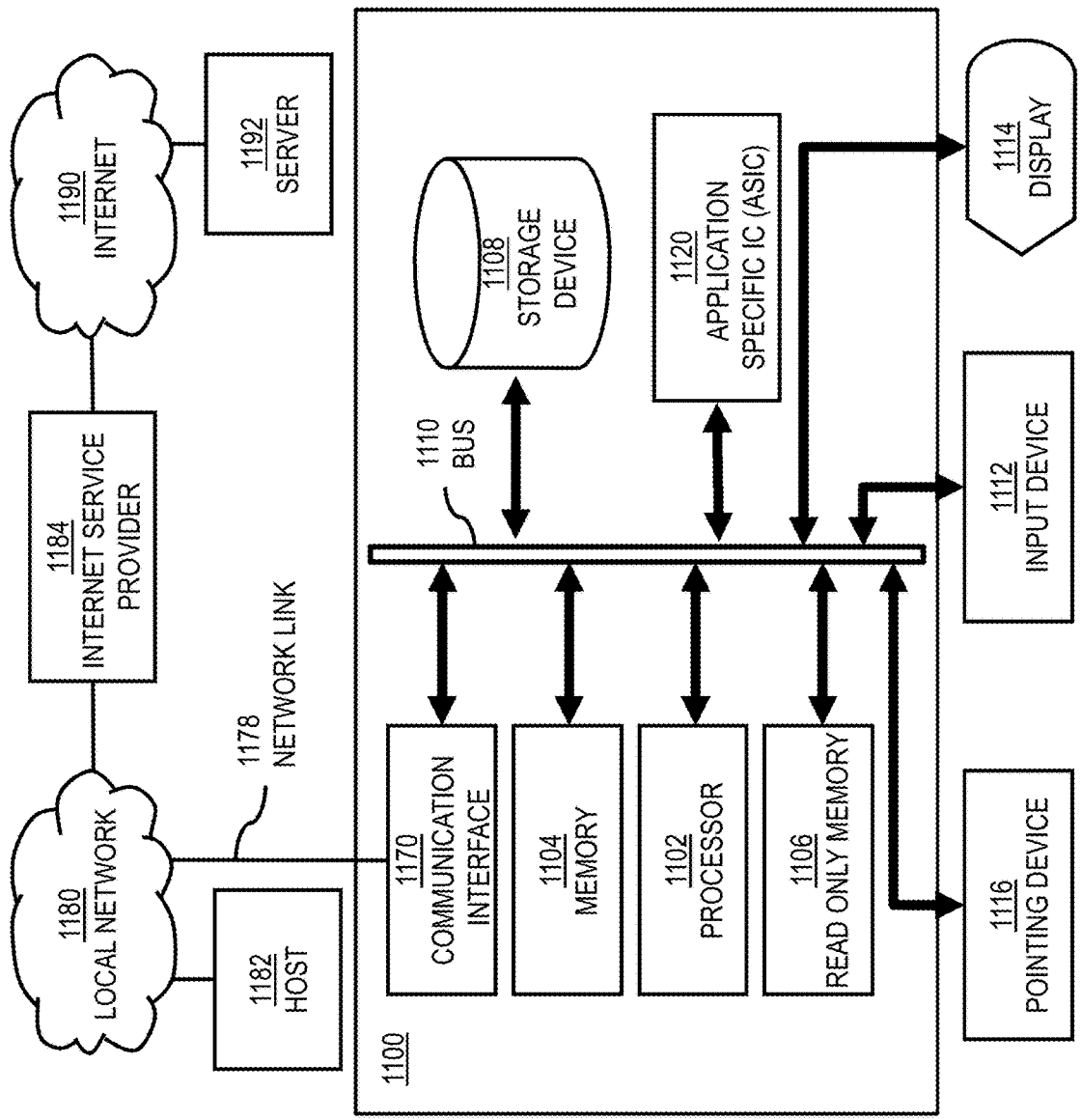
FIG. 11 is a diagram of hardware that can be used to implement an embodiment of the processes described herein.

FIG. 11 illustrates a computer system 1100 upon which an embodiment of the invention may be implemented. Computer system 1100 is programmed (e.g., via computer program code or instructions) to provide location embeddings as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing location embeddings. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RANI) or other dynamic storage device, stores information including processor instructions for providing location embeddings. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing location embeddings, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners, and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic, or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 131 for providing location embeddings.

The term computer-readable medium is used herein to refer to any medium that participates in providing information to processor 1102, including instructions for execution. Such a medium may take many forms, including, but not limited to, non-volatile media, volatile media, and transmission media. Non-volatile media include, for example, optical or magnetic disks, such as storage device 1108. Volatile media include, for example, dynamic memory 1104.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system can be deployed in various configurations within other computer systems, e.g., host 1182 and server 1192.

FIG. 12 illustrates a chip set 1200 upon which an embodiment of the invention may be implemented. Chip set 1200 is programmed to provide location embeddings as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide location embeddings. The memory 1205 also stores the data associated with or generated by the execution of the inventive steps.

Figure 13:
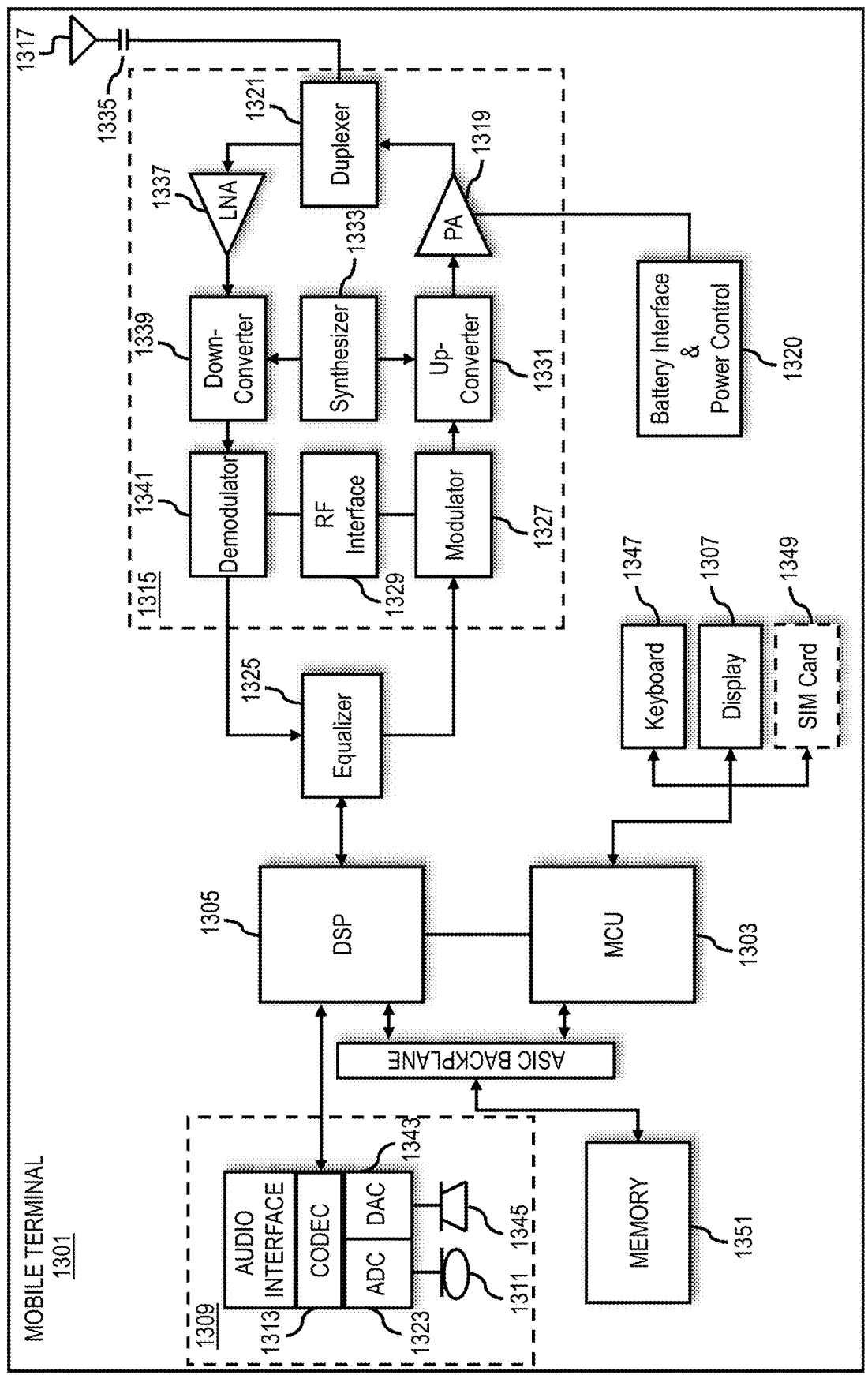
FIG. 13 is a diagram of a terminal that can be used to implement an embodiment of the processes described herein.

FIG. 13 is a diagram of exemplary components of a mobile terminal 1301 (e.g., a vehicle 123 and/or UE 125 or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide location embeddings. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   receiving multi-modal relational location data associated with a location as an input to a machine learning model, wherein the machine learning model is configured to perform a skip-gram task on the multi-modal relational location data, the skip-gram task comprising predicting one or more neighboring locations or associated features at a given geographic resolution, wherein the multi-modal relational location data indicates a physical spatial relationship, a semantic relationship, or a combination thereof between the location and one or more other different locations; and wherein the multi-modal relational location data is extracted from a location graph comprising a plurality of nodes respectively representing the location and the one or more other different locations and a plurality of edges between the plurality of nodes respectively representing the physical spatial relationship, the semantic relationship, or a combination thereof;
   initiating a processing of the multi-modal relational location data using the machine learning model during training of the machine learning model;
   extracting a vector representation of the location from a hidden layer of the machine learning model after the processing;
   providing the vector representation of the location as a location embedding output; and
   reusing the location embedding output for one or more other machine learning tasks to reduce an amount of time, an amount of resources, or a combination thereof for training one or more other machine learning models to perform the one or more other machine learning tasks.

2. The method of claim 1, wherein the location embedding output is provided as an input to a downstream machine learning task.

3. The method of claim 1, wherein the vector representation is a fixed-length, real-valued vector that encodes one or more attributes of the location.

4. The method of claim 1, wherein the machine learning model is trained to predict the location based on one or more other locations.

5. The method of claim 1, wherein the machine learning model is trained to perform a general task based on the input, and wherein the vector representation is an intermediate representation of the location used to perform the general task.

6. The method of claim 5, wherein the general task is a location categorization task.

7. The method of claim 1, wherein the hidden layer from which the vector representation is extracted is a penultimate layer of the machine learning model.

8. The method of claim 1, wherein the location is provided at a designated geographic resolution.

9. The method of claim 8, wherein the location embedding output applies to one or more downstream machine learning tasks that use the designated geographic resolution.

10. An apparatus comprising:
    at least one processor; and
    at least one memory including computer program code for one or more programs,
    the at least one memory and the computer program code configured to, within the at least one processor, cause the apparatus to perform at least the following,
      receive a location embedding comprising a vector representation of a location, wherein the location embedding is generated by extracting the vector representation from a hidden layer of an upstream machine learning model that processed location data associated with the location to generate vector representation, wherein the upstream machine learning model is configured to perform a skip-gram task on multi-modal relational location data, the skip-gram task comprising predicting one or more neighboring locations or associated features at a given geographic resolution, wherein the location data indicates a physical spatial relationship, a semantic relationship, or a combination thereof between the location and one or more other different locations; and wherein the location data is extracted from a location graph comprising a plurality of nodes respectively representing the location and the one or more other different locations and a plurality of edges between the plurality of nodes respectively representing the physical spatial relationship, the semantic relationship, or a combination thereof; and
      provide the location embedding as an input to a machine learning task during training of the machine learning task,
      wherein an output of the machine learning task is generated based, at least in part, on the location embedding, and
      wherein the location embedding is reused in another machine learning model trained to perform the machine learning task to reduce an amount of time, an amount of resources, or a combination thereof for training the machine learning model.

11. The apparatus of claim 10, wherein the vector representation is used as a direct input into the machine learning task.

12. The apparatus of claim 10, wherein the vector representation is included in an embedding layer of the machine learning task.

13. The apparatus of claim 10, wherein the machine learning model is trained to predict the location based on one or more other locations associated.

14. The apparatus of claim 10, wherein the machine learning model is trained to perform a general task based on the input, and wherein the vector representation is an intermediate representation of the location used to perform the general task.

15. A non-transitory computer-readable storage medium for providing map embedding analytics for a neural network, carrying one or more sequences of one or more instructions which, when executed by one or more processors, cause an apparatus to perform:

receiving multi-modal relational location data associated with a location as an input to a machine learning model, wherein the machine learning model is configured to perform a skip-gram task on the multi-modal relational location data, the skip-gram task comprising predicting one or more neighboring locations or associated features at a given geographic resolution, wherein the multi-modal relational location data indicates a physical spatial relationship, a semantic relationship, or a combination thereof between the location and one or more other different locations; and wherein the multi-modal relational location data is extracted from a location graph comprising a plurality of nodes respectively representing the location and the one or more other different locations and a plurality of edges between the plurality of nodes respectively representing the physical spatial relationship, the semantic relationship, or a combination thereof;

initiating a processing of the multi-modal relational location data using the machine learning model during training of the machine learning model;

extracting a vector representation of the location from a hidden layer of the machine learning model after the processing;

providing the vector representation of the location as a location embedding output; and reusing the location embedding output for one or more other machine learning tasks to reduce an amount of time, an amount of resources, or a combination thereof for training one or more other machine learning models to perform the one or more other machine learning tasks.

16. The non-transitory computer-readable storage medium of claim 15, wherein the location embedding output is provided as an input to a downstream machine learning task.

17. The non-transitory computer-readable storage medium of claim 15, wherein the vector representation is a fixed-length, real-valued vector that encodes one or more attributes of the location.

18. The non-transitory computer-readable storage medium of claim 15, wherein the hidden layer from which the vector representation is extracted is a penultimate layer of the machine learning model.

19. The non-transitory computer-readable storage medium of claim 15, wherein the location is provided at a designated geographic resolution.

* * * * *